May 30, 1967
C. R. KING
3,322,367
ROLL FILM HOLDERS
Filed Aug. 6, 1965
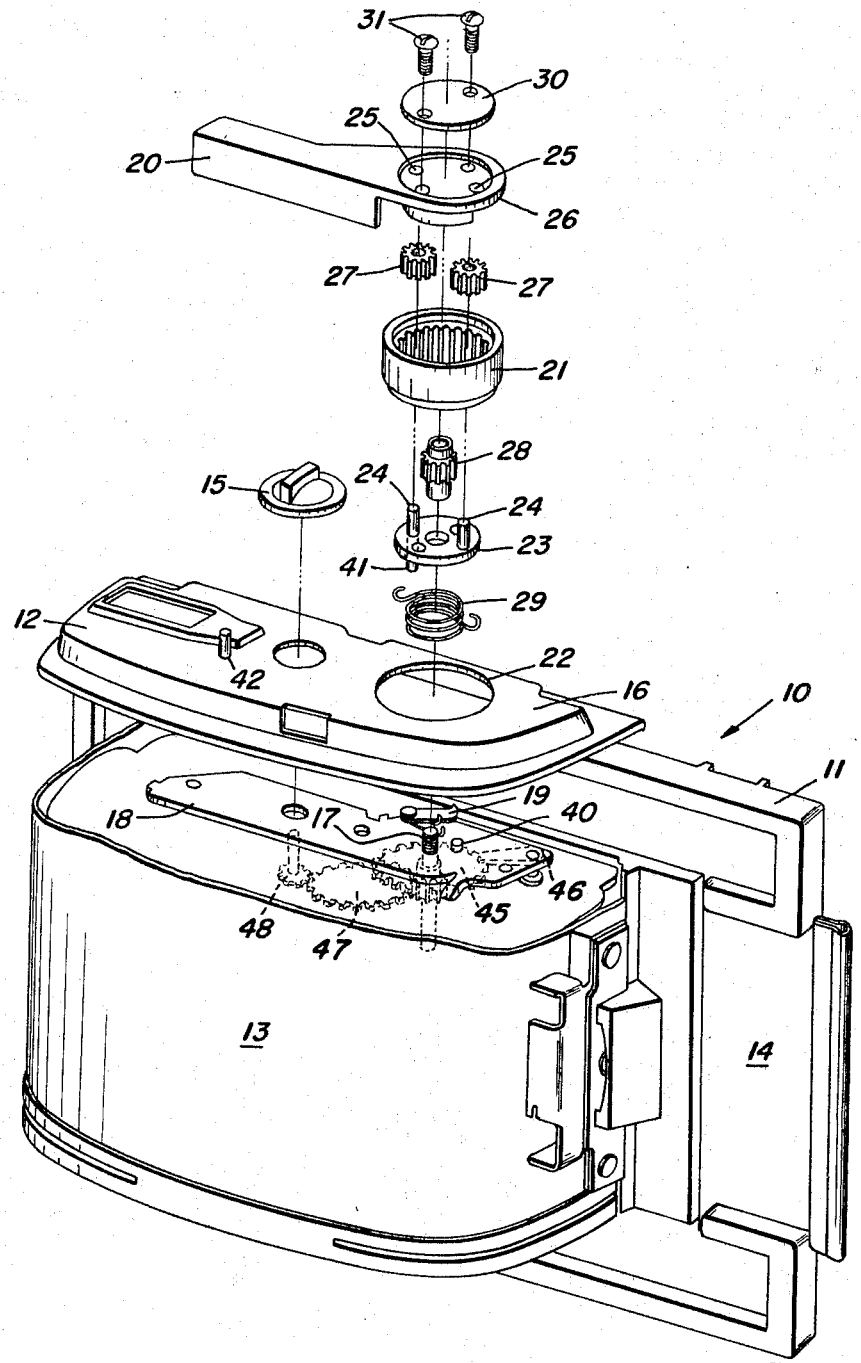
INVENTOR.
CHARLES R. KING
BY
Crumpston & Shaw
HIS ATTORNEY

United States Patent Office 3,322,367
Patented May 30, 1967

3,322,367
ROLL FILM HOLDERS
Charles R. King, East Rochester, N.Y., assignor to Graflex, Inc., Rochester, N.Y., a corporation of New York
Filed Aug. 6, 1965, Ser. No. 477,693
6 Claims. (Cl. 242—71.4)

This invention relates to an improvement in photographic roll film holders, and more particularly, to an improved device for transmitting motion from a film-advancing lever to a film indicator and to drive means for a take-up spool in a photographic roll film holder.

A variety of photographic roll film holders are known in the photographic arts, and such holders have been provided with a supply spool having a coiled strip of unexposed photographic film, a take-up spool on which exposed film is wound, and a driving device for advancing the take-up spool by the amount necessary to move the film strip one exposure distance within the holder so that a sequence of photographic exposures can be made on the strip. Indicators including meters, dials, or other devices have been used for indicating the position of the film within such holders as by showing the number of exposures made or remaining on the roll. Winding knobs and film-advancing levers have been used for transmitting driving power to the take-up spool and the indicator-advancing mechanism.

The motion-transmitting means previously used in association with film-advancing levers of the "quick wind" variety have normally been complex, bulky, expensive, and incompatible with drive train mechanisms used in association with winding knobs. Accordingly, it is an object of this invention to overcome such disadvantages in prior art drives for film-advancing levers.

Another object of the invention is to provide a compact, inexpensive, and serviceable drive mechanism by which a film-advancing lever can replace a winding knob with minimum modification of associated structure.

Another object of the invention is to arrange a drive mechanism for a film-advancing lever on the outside of a conventional roll film holder and to confine such a drive mechanism within the space normally occupied by a film-advancing knob.

These and other objects of the invention will be apparent hereinafter from the specification, the drawing, and from the subject matter claimed. A specific preferred embodiment of the invention will hereinafter be more fully described, the inventive subject matter being claimed at the end of this specification.

The drawing, which is a part of this specification, shows a partially exploded isometric view of a photographic roll film holder having a drive mechanism according to the invention.

Generally, the invention resides in a compact drive mechanism adapted for transmitting movement from a film-advancing lever to the take-up spool drive and the film indicator mechanism of a photographic roll film holder, such drive mechanism being disposed outside the holder and within the space otherwise occupied by a film-winding knob. In a preferred embodiment of the invention as illustrated in the drawing, the elements of the inventive drive mechanism are shown in the exploded portion of the drawing.

A known photographic roll film holder 10 is shown in the unexploded portion of the drawing, and such holder includes a frame 11, a carriage 12 for supporting supply and take-up spools (not shown), a cover 13 for enclosing film in darkness within the holder, and a removable slide 14 for covering an exposure aperture at the front of the holder. Within holder 10 are known take-up spool drive means schematically represented by drive element 17 shown in phantom. Rotational motion of drive element 17 is transmitted to a take-up spool (not shown) and to known associated drive means such as gears 47 and 48 shown in phantom for driving a dial 15 for indicating the position of the film in the holder as by showing the number of exposures made or remaining on the film strip. Such a film-indicating mechanism is contained within housing 16 disposed over one end of the holder 10.

The preferred embodiment of the invention is illustrated in the exploded portion of the drawing and relates to an improved mechanism for rotating drive element 17 as desired. It can be seen from the illustration that the inventive mechanism is compactly arranged adjacent housing 16.

Referring to the exploded elements of the drawing, the lever 20 provides rotational motion for drive mechanisms of holder 10. A ring gear 21 is preferably rotatably mounted within aperture 22 in housing 16, and ring gear 21 is preferably about the size of a conventional knurled winding knob for film holders. Ring gear 21 has internal gear teeth as illustrated, and preferably, a pawl 19 is mounted on plate 18 to engage the teeth of ring gear 21 to permit rotation of ring gear 21 in only one direction.

A carrier assembly 23, preferably provided with a pair of upright studs 24, is disposed within ring gear 21 in a counter-bore in the bottom of ring gear 21. Studs 24 preferably engage a hub portion 26 of lever 20 as by fitting in respective apertures 25 so that carrier assembly 23 is rotatable with lever 20. Hub portion 26 of lever 20 is disposed over the end of ring gear 21 so that lever 20 is rotatable about the axis of ring gear 21. A cap 30 is preferably secured over the hub portion 26 of lever 20 by suitable means such as screws 31 threaded into carriage 23 to hold the gears, carriage, and lever together.

Planet gears 27 are rotatably mounted on respective studs 24 and are disposed in meshed engagement with ring gear 21 so as to rotate on studs 24 as carrier 23 and ring gear 21 are moved relative to each other. A sun gear 28 is rotatably mounted with carrier assembly 23 in meshed engagement with each of the planet gears 27 so as to be coaxial with ring gear 21 and carrier assembly 23 and rotatable about the axis of ring gear 21.

Drive element 17 is coupled to sun gear 28 by suitable means such as a threaded engagement so that element 17 is rotatable with sun gear 28 and so as to hold the gear assembly and lever 20 in place on holder 10. Rotation of sun gear 28 is thus transmitted through element 17 to members of the film and indicator drive mechanisms.

A spring 29 preferably engages a portion of holder 10 such as stud 40 on plate 18 and a downwardly extending portion 41 of one of the studs 24 on carrier assembly 23 so as to bias carrier assembly 23 and lever 20 in one rotational direction. A stud 42 extending above housing 16 provides a stop against which lever 20 rests in a normally assumed position. Carrier 23 is stopped in a corresponding normal position by engagement of stud 41 with the support shaft for pawl 19. Stud 41 also provides a winding position stop for carrier 23 and lever 20 by engaging spring anchoring stud 40. A known pawl 46 and ratchet 45, both shown in phantom, in the holder's drive mechanism prevents reverse rotation of the film-take-up drive including reverse rotation of element 17 or sun gear 28.

In operation, lever 20 is rotated (counterclockwise as illustrated) a predetermined amount of approximately 180° or less about the axis of ring gear 21 to rotate carrier assembly 23 the same amount. Pawl 19 holds ring gear 21 against rotation in the same direction with lever 20. Planet gears 27 are thus driven about the inner periphery of ring gear 21 and caused to rotate upon studs 24. Such rotation of planet gears 27 drives sun gear 28 in a corresponding rotation that is transmitted to drive element 17 which is coupled to known elements of the film indicator and take-up spool drive mechanisms.

Spring 29 resists the rotation of lever 20 and returns lever 20 and carrier assembly 23 to their normally assumed positions. A known pawl 46 in the holder's drive mechanism, prevents any reverse rotation of element 17 and thus holds sun gear 28 from rotation in a reverse direction so that as lever 20 returns to its normally assumed position, ring gear 21 is rotated by planet gears 27 returning to a normally assumed position about fixed sun gear 28.

Rotation of lever 20 produces a relatively larger amount of rotation of sun gear 28 so that lever 20 can be moved through a relatively small arc and still drive element 17 sufficiently far to accomplish the desired film and indicator advancement. In addition to a three-to-one mechanical advantage from ring gear 21 to sun gear 28, the rotation of lever 20 is in the same direction as that of sun gear 28 so that each increment of rotation of lever 20 provides approximately four times the rotational increment to sun gear 28 and drive element 17.

The inventive device is not limited to two planet gears, but three or more planet gears may be arranged within ring gear 21 within the spirit of the invention. Furthermore, drive motion can also be obtained with a ring gear fixed in place or by rotating a ring gear relative to a fixed carrier assembly, and any of these alternatives are within the spirit of the invention.

It can be seen that the inventive motion-transmitting device is compact, is easily arranged in a small space adjacent the outer surface of housing 16 for a conventional roll holder 10, and is contained within ring gear 21 in a space previously occupied by a knurled winding knob. Also, by the inventive drive arrangement, the movement of lever 20 is limited to about 180° and lever 20 stays clear of frame 11.

The invention has been disclosed by reference to the details of a preferred embodiment, but such disclosure is intended, to be illustrative, rather than limting, and other embodiments and variations of the invention will readily occur to those skilled in the art, within the scope of the subject matter claimed.

I claim:

1. In a holder for photographic roll film including a supply spool, a take-up spool, means for winding said take-off spool to advance a strip of photographic film for a sequence of exposures, and means enclosed within a housing at one end of said holder for indicating the position of said strip in said holder, the improvement comprising: a ring gear having internal teeth and being mounted adjacent said housing; a film-advancing lever mounted closely over said housing for pivotal motion about the axis of said ring gear; a plurality of rotatable planet gears mounted within said ring gear and meshed with said ring gear; means cooperable with said lever for moving said planet gears relative to said ring gear to rotate said planet gears; a sun gear disposed in meshed relation with said planet gears for rotation therewith; and means extending through said housing for transmitting said rotation of said sun gear to said indicating means and to said winding means.

2. The device of claim 1 including a carrier assembly for said planet gears; a plurality of studs arranged on said carrier assembly and on each of which a respective one of said planet gears is rotatably mounted; and means for coupling said carrier assembly to said lever for rotation therewith whereby said planet gears are rotatably moved relative to said ring gear.

3. The device of claim 2 including a spring arranged to engage a portion of said holder and said carrier assembly for biasing said carrier assembly and said lever toward a normally assumed position.

4. In a holder for photographic roll film including a supply spool, a take-up spool, means for winding said take-up spool to advance a strip of photographic film for a sequence of exposures within said holder, a housing disposed at one end of said holder, and means enclosed within said housing for indicating the position of said strip in said holder, the improvement comprising: a ring gear having internal teeth and being rotatably mounted on said housing; a film-advancing lever having a hub fitting over the open end of said ring gear, said lever being mounted closely over said housing for pivotal motion about the axis of said ring gear; a carrier assembly disposed within said ring gear and having a pair of studs coupled to said hub so that said carrier assembly is pivotal with said lever about the axis of said ring gear; a pair of planet gears, each of which is rotatably mounted on a respective one of said studs for meshed engagement with said ring gear; a sun gear rotatably mounted coaxially with said ring gear and in meshed engagement with said planet gears for rotation therewith; a spring disposed in engagement with a portion of said housing and said carrier assembly for biasing said carrier assembly and said lever in a first rotational direction; means for stopping rotation of said lever in said first direction for defining a normally assumed rest position for said lever; and means coupled with said sun gear for transmitting rotation thereof to said indicating means within said housing and to said winding means within said holder.

5. The device of claim 4 including a pawl disposed in engagement with the teeth of said ring gear for preventing rotation of said ring gear in one direction.

6. The device of claim 5 including a pawl and ratchet disposed in said winding means for preventing a reverse rotation of said take-up spool and said sun gear.

References Cited

UNITED STATES PATENTS 2,365,690  12/1944  Fassin _____ 242—71.4
3,021,773   2/1962  Hintze et al. _____ 242—71.4 X FRANK J. COHEN, *Primary Examiner.*

N. L. MINTZ, *Assistant Examiner.*